United States Patent [19]
Cheung

[11] Patent Number: 6,097,778
[45] Date of Patent: Aug. 1, 2000

[54] GRAVITY DRIVEN SUCTION PUMP SYSTEM, METHODS, AND APPARATUS

[75] Inventor: Yee K. Cheung, San Jose, Calif.

[73] Assignee: General Electric Company, Schenectady, N.Y.

[21] Appl. No.: 09/215,892

[22] Filed: Dec. 18, 1998

[51] Int. Cl.[7] .................................................. G21C 9/012
[52] U.S. Cl. ........................................ 376/283; 376/282
[58] Field of Search .................................. 376/282, 402, 376/283; 417/54, 76, 105, 119, 150, 153, 177; 165/104.32

[56] References Cited

U.S. PATENT DOCUMENTS

| | | | |
|---|---|---|---|
| 4,892,140 | 1/1990 | Honovich | 165/110 |
| 5,106,571 | 4/1992 | Wade et al. | 376/283 |
| 5,145,639 | 9/1992 | Hui | 376/283 |
| 5,377,243 | 12/1994 | Hill | 376/283 |
| 5,426,681 | 6/1995 | Aburomia | 376/283 |
| 5,761,262 | 6/1998 | No et al. | 376/298 |
| 5,788,464 | 8/1998 | Gabelgaard | 417/76 |

*Primary Examiner*—Charles T. Jordan
*Assistant Examiner*—K. Kevin Mun
*Attorney, Agent, or Firm*—Armstrong, Teasdale LLP

[57] ABSTRACT

A gravity driven suction pump for a nuclear reactor condenser is described. The gravity driven suction pump is utilizes the potential energy of the condenser condensate to move condensible and noncondensible gases through the condenser. The gravity driven suction pump includes a drain line having a venturi section and a suction line extending from the condenser into the venturi section. The venturi section alters the flow velocity of condensate in the throat of the drain line and creates a pressure differential through the suction line to drain the noncondensible gases from the condenser.

18 Claims, 3 Drawing Sheets

6,097,778

GRAVITY DRIVEN SUCTION PUMP SYSTEM, METHODS, AND APPARATUS

BACKGROUND OF THE INVENTION

This invention relates generally to nuclear reactors and, more particularly, to a gravity driven suction pump for a reactor condenser.

One known boiling water nuclear reactor includes a drywell, or containment, a wetwell, a gravity driven cooling system (GDCS) and a passive cooling containment system (PCCS). The drywell can withstand pressure generated by a reactor pressure vessel (RPV) during reactor operation, and the PCCS limits the pressure within the containment to a pressure below a selected pressure to keep the RPV core substantially cool.

Condensible and noncondensible gases exist or are generated by processes in the gas chamber of the nuclear reactor and are typically moved into the condenser. Condensible gases are condensed in the condenser. However, the capacity of the condenser degrades as the accumulation of noncondensible gases in the condenser increases.

Noncondensible gases can be removed from a condenser through vent pipes and valves controlled by automatic logic or operator action. The steam and noncondensible gases are vented to a suppression pool. The steam is condensed in the suppression pool and the noncondensible gases pass through the pool surface and accumulate in the wetwell, i.e., the air space above the suppression pool.

Alternatively noncondensible gases can be passed through a condenser by an electrical suction pump or a blower. The condenser receives steam and noncondensible gases from the drywell. The blower is connected to the condenser vent line and removes the noncondensible gases by forced air circulation from the condenser and discharges the gases back to the drywell.

In yet another alternative, vent pipes can discharge the noncondensible gases to an area of relatively lower pressure. Such venting can be employed in addition to and along with utilizing the electrical suction pump or the blower described above. The vent pipes discharge steam and noncondensible gases into the suppression pool and the wetwell.

A disadvantage of removing noncondensible gases from the condenser is that active components and operator action are required. Further, venting the noncondensible gases to an area of low pressure may result in a higher containment pressure after a postulated accident than if the noncondensible gases are evenly distributed among the drywell and the wetwell.

Accordingly, it would be desirable to provide a system for removing noncondensible gases from the condenser without active components or operator action. Additionally, it would be desirable to provide a system that enhances the circulation of condensible and noncondensible gases through the condenser and thus enhances the performance of the condenser system.

BRIEF SUMMARY OF THE INVENTION

These and other objects may be attained by a gravity driven suction pump system for a nuclear reactor condenser configured to utilize the potential energy of a condensate to enhance the flow of condensible and noncondensible gases through the condenser. The gravity driven suction pump system includes an intake line, a first header, a condensing section, a second header, and at least one drain line configured to deliver the condensate and noncondensible gases to a nuclear reactor gas chamber. The potential energy of the condensate is used to remove the noncondensible gases from the condenser.

More specifically, the gravity driven suction pump system utilizes the combination of a venturi section located in at least one drain line and a suction line in flow communication with the condenser. During operation of the system, condensate is formed from condensible gas and moved from the condenser to the drain line. The flow rate of the condensate through the drain line and back to the gas chamber is accelerated by the venturi section which generates a pressure differential through the suction line and draws the noncondensible gases out of the condenser.

The above described gravity driven suction pump system is believed to improve the efficiency of the nuclear reactor condenser by requiring no active components or operator action, and enhancing circulation of condensible and noncondensible gases through the condenser. The gravity driven suction pump also complements the performance of the condenser.

DETAILED DESCRIPTION OF THE INVENTION

Figure 1:
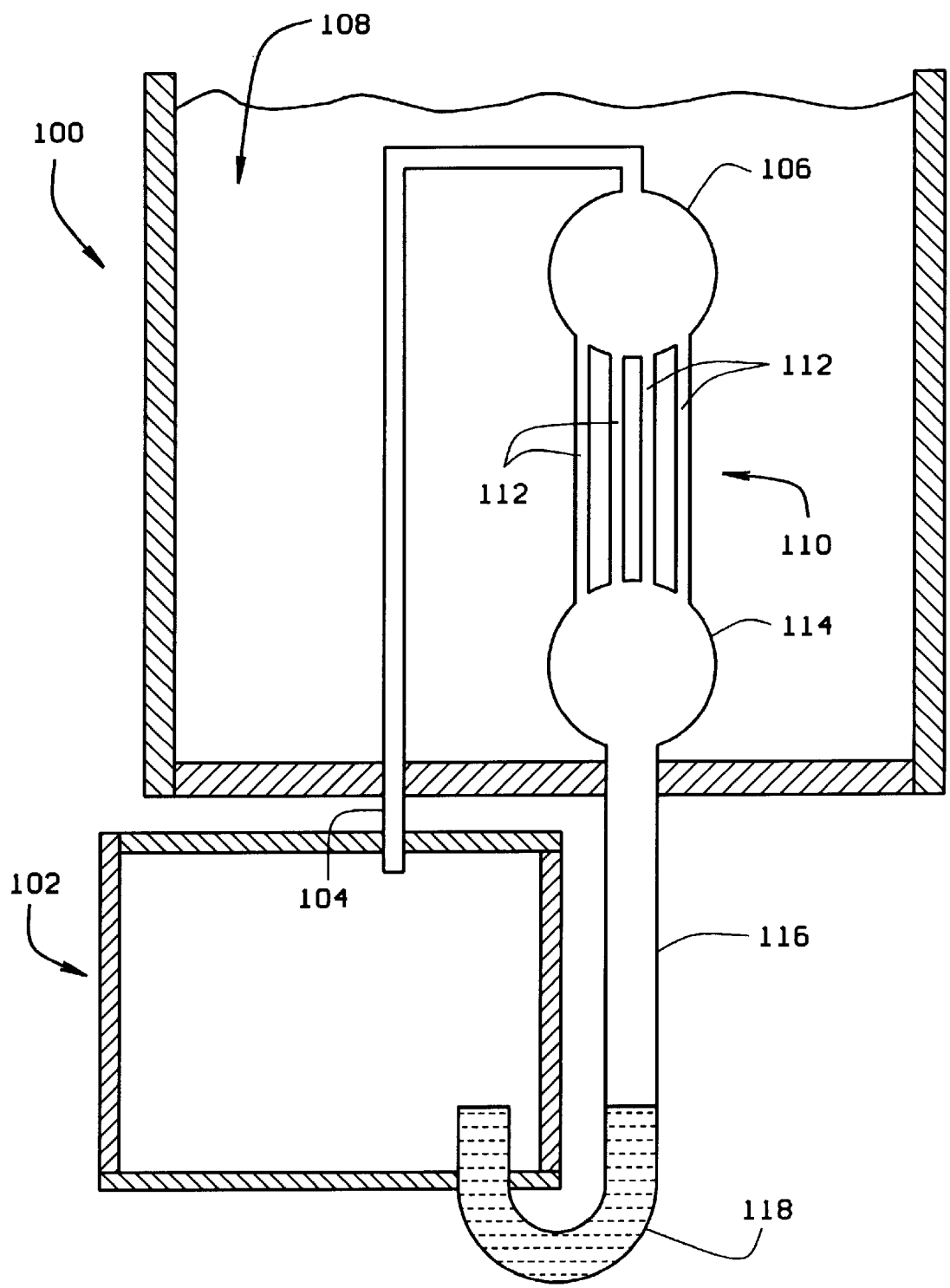
FIG. 1 is a schematic illustration of a gas chamber and a typical condenser.

FIG. 1 illustrates a typical known condenser 100 for a nuclear reactor. Condenser 100 is a multistage system for removing and cooling gases produced in a nuclear reactor. The gases produced by the reactor and circulated through condenser 100 typically include condensible and noncondensible gases.

Condenser 100 is connected to and in flow communication with gas chamber 102 through an intake line 104. Intake line 104 is connected to and in flow communication with a first header 106. First header 106 is submerged in a condenser pool of water 108 which also partially covers intake line 104. First header 106 is connected to and in flow communication with a condensing section 110 of condenser 100. Condensing section 110 includes a plurality of condenser tubes 112 and is connected to and in flow communication with a second header 114.

First header 106, condensing section 110, and second header 114 represent the heat exchanger portion of condenser 100 and are shown in a vertical position in FIG. 1, but in other embodiments, may be positioned in any manner including a horizontal position. Second header 114 is connected to and in flow communication with a drain line 116. Drain line 116 is connected to and in flow communication with gas chamber 102 and typically includes a loop seal 118.

During system operation, condensible and noncondensible gases are generated and contained in gas chamber 102. The gases are circulated through condenser 100 where the condensible gas is converted into condensate, which is drained back into the gas chamber 102. However, the noncondensible gases may remain trapped in condenser 100.

Intake line 104 directs the condensible and noncondensible gases from gas chamber 102 to first header 106. The condensible and noncondensible gases are less dense in the gas chamber and increase in density as they lose their heat and are driven through condensing section 110 by the density differential between the gas mixture in condenser 100 and in gas chamber 102.

The condensible gas is converted into condensate by the transfer of heat from the condensible gas into the condenser pool of water 108 surrounding condensing section 110. The condensate and the noncondensible gas is collected in second header 114 which directs the condensate to drain line 116. Drain line 116 collects the condensate from second header 114 and discharges the condensate back to gas chamber 102. Loop seal 118 is used to prevent any gas mixture from flowing backward from gas chamber 102 into condensing section 110 through drain line 116.

Figure 2:
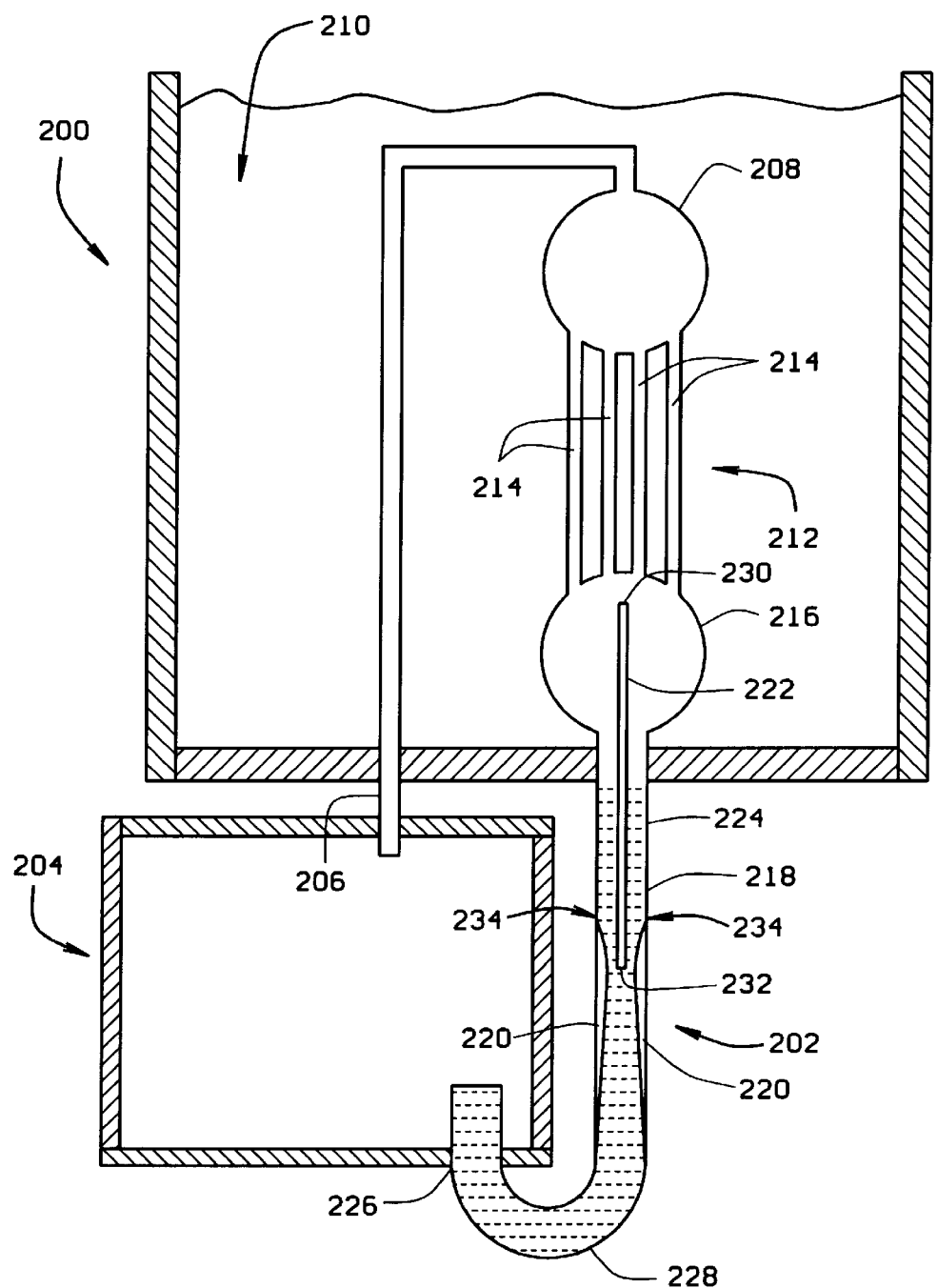
FIG. 2 is a schematic illustration of a gas chamber and a condenser with a gravity driven suction pump in accordance with one embodiment of the present invention.

FIG. 2 illustrates a condenser 200 with a gravity driven suction pump 202 for a nuclear reactor. Condenser 200 is in flow communication with a gas chamber 204 through an intake line 206. Condensible and noncondensible gases flow from gas chamber 204 through intake line 206 and are directed to a first header 208. First header 208 is submerged in a condenser pool of water 210 and is in flow communication with intake line 206.

First header 208 is also connected to and in flow communication with a condensing section 212. Condensing section 212 includes a plurality of condenser tubes 214. In an alternate embodiment, condensing section 212 may include at least one condenser plate (not shown). Condensing section 212 is connected to and in flow communication with a second header 216. Second header 216 is connected to and in flow communication with gravity driven suction pump 202 which is connected to and in flow communication with gas chamber 204.

Gravity driven suction pump 202 includes a drain line 218, a venturi section 220, and a suction line 222. Venturi section 220 restricts the flow area of drain line 218. Drain line 218 has a first end 224 coupled to second header 216, and a second end 226 coupled to gas chamber 204. A loop seal 228 is located in drain line 218 between first end 224 and second end 226. Suction line 222 has a first end 230 that extends into second header 216 and a second end 232 that extends into throat 234 of drain line 218. Second end 232 extends into venturi section 220 of drain line 218.

The condensible and noncondensible gas mixture moves from gas chamber 204 through intake line 206 to first header 208. First header 208 directs the gas mixture to condensing section 212. Heat is transferred from the gas mixture to the condensing pool of water 210 by condensing section 212. The condensible gas is cooled, forms condensate and moves along with the cooled noncondensible gas to second header 216. The noncondensible gas and the condensate collect in second header 216.

The condensate flows from second header 216 into gravity driven suction pump 202. Gravity driven suction pump 202 directs the noncondensible gas collected in second header 216 through drain line 218 back to gas chamber 204 through suction line 222. Loop seal 228 prevents the gas mixture from flowing backward from gas chamber 204 into drain line 218.

In operation, condensate drains back into gas chamber 204 through drain line 218 at a flow rate. The condensate flow rate has a condensate velocity at throat 234 of drain line 218. Venturi section 220 increases the condensate velocity through drain line 218 while keeping the static pressure at throat 234 low.

The noncondensible gases in second header 216 have a static pressure. When the pressure inside second header 216 is larger than the pressure at second end 232 of suction line 220, the condensible and noncondensible gases remaining in second header 216 will be suctioned from second header 216 through drain line 218 and into gas chamber 204.

Condenser 200 utilizes gravity driven suction pump 202 to significantly increase the mass flow rate through condenser 200. Gravity driven suction pump 202 reduces the degradation effect of accumulating noncondensible gases inside condenser 200 without active components or operator action.

Figure 3:
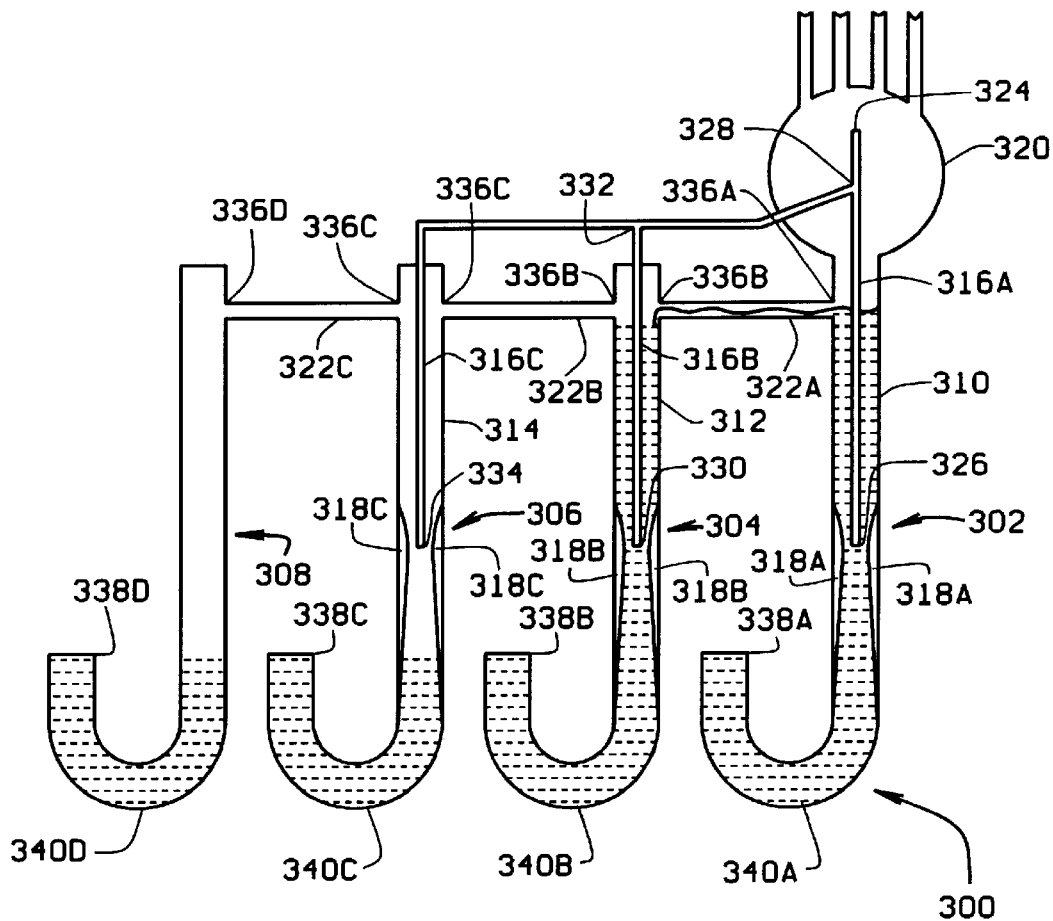
FIG. 3 is a schematic illustration of a multiple stage gravity driven suction pump system in accordance with another embodiment of the present invention.

FIG. 3 illustrates a multiple stage gravity driven suction pump system 300, in accordance with another embodiment of the present invention. Multiple stage gravity driven suction pump system 300 includes a first gravity driven suction pump 302, a second gravity driven suction pump 304, a third gravity driven suction pump 306, and a drain line 308. Suction pumps 302, 304, and 306 include drain lines 310, 312, and 314, suction lines 316A, 316B, and 316C and venturi sections 318A, 318B, and 318C, respectively. A second header 320 is directly connected to and in flow communication with first gravity driven suction pump 302.

Second header 320 is in flow communication with second gravity driven suction pump 304, third gravity driven suction pump 306, and drain line 308 through spill-over connection lines 322A, 322B, and 322C. Second header 320 also is in flow communication with second gravity driven suction pump 304 and third gravity driven suction pump 306 through suction lines 316B and 316C, respectively.

Suction line 316A is in flow communication with second header 320 at a first end 324 and a second end 326 is positioned in first gravity driven suction pump 302. Suction line 316B is connected to suction line 316A and in flow communication with second header 320 at a first end 328 and a second end 330 is positioned in second gravity driven suction pump 304. Suction line 316C is connected to suction line 316B at a first end 332 and a second end 334 is positioned in third gravity driven suction pump 306. Suction lines 316A, 316B, and 316C extends into venturi sections 318A, 318B, and 318C, respectively.

Drain lines 310, 312, 314, and 308 have a first end 336A, 336B, 336C, and 336D and a second end 338A, 338B, 338C, and 338D, respecitvely. Spill-over connection line 322A connects first gravity driven suction pump 302 at first end 336A to second gravity driven suction pump 304 at first end 336B. Spill-over connection line 322B connects second gravity driven suction pump 304 at first end 336B to third gravity driven suction pump 306 at first end 336C. Spill-over connection line 322C connects third gravity driven suction pump 306 at first end 336C to drain line 308 at first end 336D.

Loop seals 340A, 340B, 340C, and 340D are located in first gravity driven suction pump 302, in second gravity driven suction pump 304, in third gravity driven suction pump 306, and in drain line 308 between first ends 336A, 336B, 336C, and 336D, and second ends 338A, 338B, 338C, and 338D, respectively. Drain lines 310, 312, 314 and 308 connect to a gas chamber (not shown in FIG. 3) at second ends 338A, 338B, 338C, and 338D.

Alternate embodiments of the present invention may include any number of drain lines. For example, multiple stage gravity driven suction pump system 300 may include a plurality of N drain lines for discharging the gas mixture from second header 320 to the gas chamber. Because the last drain line, furthest away from second header 320, does not include a venturi section, N-1 drain lines include a venturi section. Also N-1 spill-over connection lines extend between the N drain lines.

In operation, when the total condensate flow from second header 320 is greater than the condensate flow rate from first gravity driven suction pump 302 to the gas chamber, the excess condensate is conveyed through spill-over connection line 322A to sequentially placed second gravity driven suction pump 304.

If the combined condensate flow rate from first gravity driven suction pump 302 and second gravity driven suction pump 304 is insufficient to handle the condensate flow back to the gas chamber, spill-over connection line 322B conveys the condensate to third gravity driven suction pump 306. Spill-over connection line 322C is in flow communication with third gravity driven suction pump 306 and drain line 308. Spill-over connection line 322C conveys excess condensate to drain line 308 from first gravity driven suction pump 302, second gravity driven suction pump 304, and third gravity driven suction pump 306. Drain line 308 is also sequentially located to accommodate large condensate flow and assure no backup of drain flow into second header 320.

To accommodate the situation when the total flow of the condensate, condensible and noncondensible gas mixture is greater than the capacity of first gravity driven suction pump 302, second gravity driven suction pump 304 and third gravity driven suction pump 306 may be used to direct the gas mixture through suction lines 316A, 316B, and 316C through drain lines 310, 312, and 314 back to the gas chamber, respectively.

Loop seals 340A, 340B, 340C, and 340D prevent condensible and noncondensible gases from moving through first gravity driven suction pump 302, second gravity driven suction pump 304, third gravity driven suction pump 306 and drain line 308 back through spill-over lines 316A, 316B, and 316C or suction lines 310A, 310B, and 310C to second header 320, respectively.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A gravity driven suction pump system for a nuclear reactor including a gas chamber, said system comprising:
   a condenser configured to be submerged in a condenser pool of water;
   at least one condensate drain line comprising a venturi section in fluid communication with said condenser and configured to deliver condensate-and noncondensible gases from said condenser to the gas chamber; and
   at least one suction line extending from said condenser into said venturi section of said drain line.

2. A gravity driven suction pump system in accordance with claim 1 wherein said condenser comprises:
   an intake line in fluid communication with the gas chamber and a heat exchanger; and
   said heat exchanger configured to utilize a condensate to deliver said noncondensible gases from said heat exchanger to the gas chamber.

3. A gravity driven suction pump system in accordance with claim 2 wherein said heat exchanger comprises:
   a first header in fluid communication with said intake line wherein said intake line directs condensible and noncondensible gases to said first header;
   a condensing section in fluid communication with said first header; and
   a second header in fluid communication with said condensing section.

4. A gravity driven suction pump system in accordance with claim 3 wherein said condensing section comprises at least one condenser tube.

5. A gravity driven suction pump system in accordance with claim 3 wherein said condensing section comprises at least one condenser plate.

6. A gravity driven suction pump system in accordance with claim 3 wherein said at least one drain line is in fluid communication with the gas chamber and further comprises a loop seal between a first end and a second end of said drain line.

7. A gravity driven suction pump system in accordance with claim 6 further comprising N drain lines, in fluid communication with said second header of said condenser, a first said drain line directly coupled to said second header, said N drain lines positioned sequentially with respect to said first drain line, said first drain line through said N−1 drain line comprising a venturi section, and wherein N is an integer greater than or equal to 2.

8. A gravity driven suction pump system in accordance with claim 7 further comprising N−1 spill-over connection lines, each said spill-over line extending between and coupled at opposing ends to a first section of adjacent drain lines.

9. A gravity driven suction pump system in accordance with claim 8 further comprising a plurality of N−1 suction lines, wherein each said suction line extends from said second header into a corresponding drain line, each said suction line having a first end and a second end, said first end located in said second header, and said second end located in said venturi section of said drain line.

10. A gravity driven suction pump system in accordance with claim 9 wherein N is equal to 4.

11. A gravity driven suction pump system for a nuclear reactor system, the nuclear reactor system including a gas chamber, said gravity driven suction pump system comprising:
    a condenser;
    at least one condenser drain line comprising a venturi section and a loop seal;
    at least one suction line extending from said condenser into said venturi section of said drain line.

12. A gravity driven suction pump system in accordance with claim 11 wherein said condenser comprises:
    a heat exchanger; and
    an intake line in fluid communication with the gas chamber and said heat exchanger.

13. A gravity driven suction pump system in accordance with claim 12 wherein said heat exchanger comprises:
    a first header in fluid communication with said intake line;
    a condensing section in fluid communication with said first header; and
    a second header in fluid communication with said condensing section.

14. A gravity driven suction pump system in accordance with claim 13 wherein said condensing section comprises at least one condenser tube.

15. A gravity driven suction pump system in accordance with claim 13 wherein said condensing section comprises at least one condenser plate.

16. A gravity driven suction pump system in accordance with claim 13 further comprising N drain lines, in fluid communication with said second header of said condenser, a first said drain line directly coupled to said second header, said N drain lines positioned sequentially with respect to said first drain line, said first drain line through said N−1 drain line comprising a venturi section, and wherein N is an integer greater than or equal to 2.

17. A gravity driven suction pump system in accordance with claim 16 further comprising N−1 spill-over connection lines, each said spill-over connection line extending between and coupled at opposing ends to a first section of adjacent drain lines.

18. A gravity driven suction pump system in accordance with claim 17 further comprising N−1 suction lines, wherein said suction line extends from said second header into corresponding drain line, each of said suction line having a first end and a second end, said first end located in said second header, and said second end located in said venturi section of said drain line.

* * * * *